United States Patent [19]

Zapomel

[11] 4,211,372
[45] Jul. 8, 1980

[54] FORK ACCESSORY FOR WINDING SPAGHETTI

[76] Inventor: Janos Zapomel, Oetlingerstrasse 5, 4057 Basel, Switzerland

[21] Appl. No.: 957,697

[22] Filed: Nov. 6, 1978

[30] Foreign Application Priority Data

Nov. 15, 1977 [CH] Switzerland ............... 14026/77

[51] Int. Cl.$^2$ ............................................. A47J 43/28
[52] U.S. Cl. ...................................... 242/1; 30/123; 30/322
[58] Field of Search ................ 242/54 R, 1, 96, 85; 30/123, 322

[56] References Cited

U.S. PATENT DOCUMENTS

| | | | |
|---|---|---|---|
| 3,138,871 | 6/1964 | Sears | 30/322 |
| 3,552,017 | 1/1971 | Smuts | 30/322 |
| 3,589,009 | 6/1971 | Miscavich et al. | 30/322 |

*Primary Examiner*—George F. Mautz
*Attorney, Agent, or Firm*—Abraham A. Saffitz

[57] ABSTRACT

A fork accessory for winding spaghetti on a fork comprising a generally rectangular base having a thickened portion at one edge defining a cylindrical recess and including clamping means to detachably secure said base to a dish on which the spaghetti is served. A collar is fitted with inwardly projecting pins which is rotatably supported in the well of said recess. A short shaft passes through the base and connects the bottom of the collar to a hand wheel below the collar and well. A fork, which is filled with spaghetti, is inserted into the collar, the hand wheel rotated, and the pins rotate the fork. A guiding wall vertically projecting from a center edge of the collar serves to neatly wrap the spaghetti around the fork which now needs only to be lifted to the mouth for eating.

2 Claims, 2 Drawing Figures

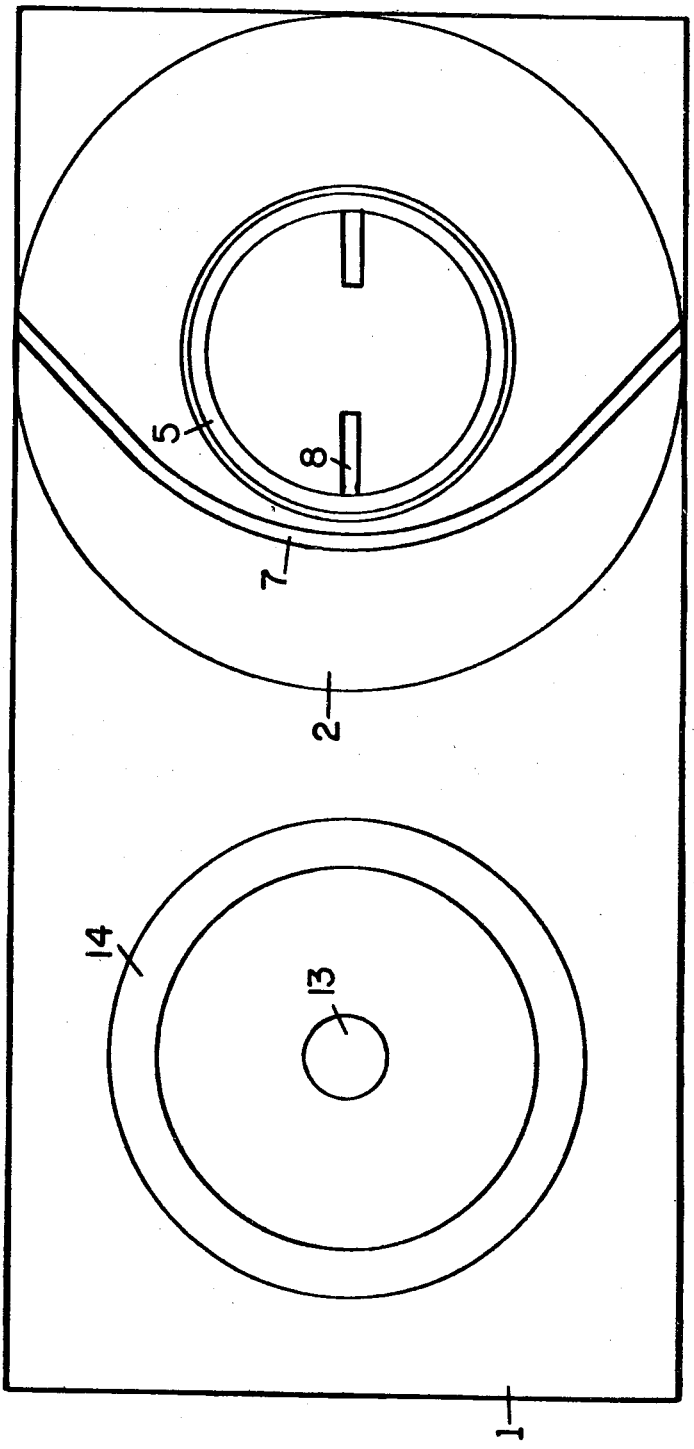

FORK ACCESSORY FOR WINDING SPAGHETTI

CROSS REFERENCE TO RELATED APPLICATION

Reference is made to Swiss Patent Application No. 14,026/77 filed in Switzerland Nov. 15, 1977 and under which priority is claimed in accordance with 35 UCS 119.

BACKGROUND OF THE INVENTION

1. FIELD OF THE INVENTION

The present invention refers to a fork accessory to aid in winding spaghetti on a fork.

2. Description of the Prior Art

The consumption of spaghetti or other similar, long noodles is usually accomplished by winding them up on a fork and lifting the so formed spaghetti wrap to the mouth. However, the winding of spaghetti on a fork requires skill and training and often presents difficulties so that clothing and table cloth are soiled.

OBJECT OF THE INVENTION

It is an object of the present invention to provide a fork accessory means which greatly simplifies the winding of spaghetti on a fork and avoids any contamination of clothing and tablecloth.

SUMMARY OF THE INVENTION

According to the invention, the fork accessory means comprises a support member to be attached to the edge of a dish with a circular recess to receive the point of the fork, said recess being partially enclosed by a vertical upwardly protruding guiding member.

In use, the fork laden with a bunch of disarranged spaghetti is introduced vertically into the circular recess and rotated about its own axis. Thereby the disarranged bunch of spaghetti is formed to a neat wrap under the influence of the sidewise arranged guiding member and compactly wound-up on the fork, so that the spaghetti can easily be lifted to the mouth and consumed.

Advantageously, a collar is rotatably arranged in the recess and provided with a number of driving pins which are circumferentially arranged along the inner top edge of the collar. A further embodiment of the fork accessory means may comprise a driving gear to rotate the collar, said driving gear comprising a handwheel and a reduction gear.

BRIEF DESCRIPTION OF THE DRAWINGS

In the following, a preferred embodiment of the fork accessory means will be described in greater detail, with reference to the accompanying drawings, in which:

FIG. 2 shows an elevational top view.

Figure 1:
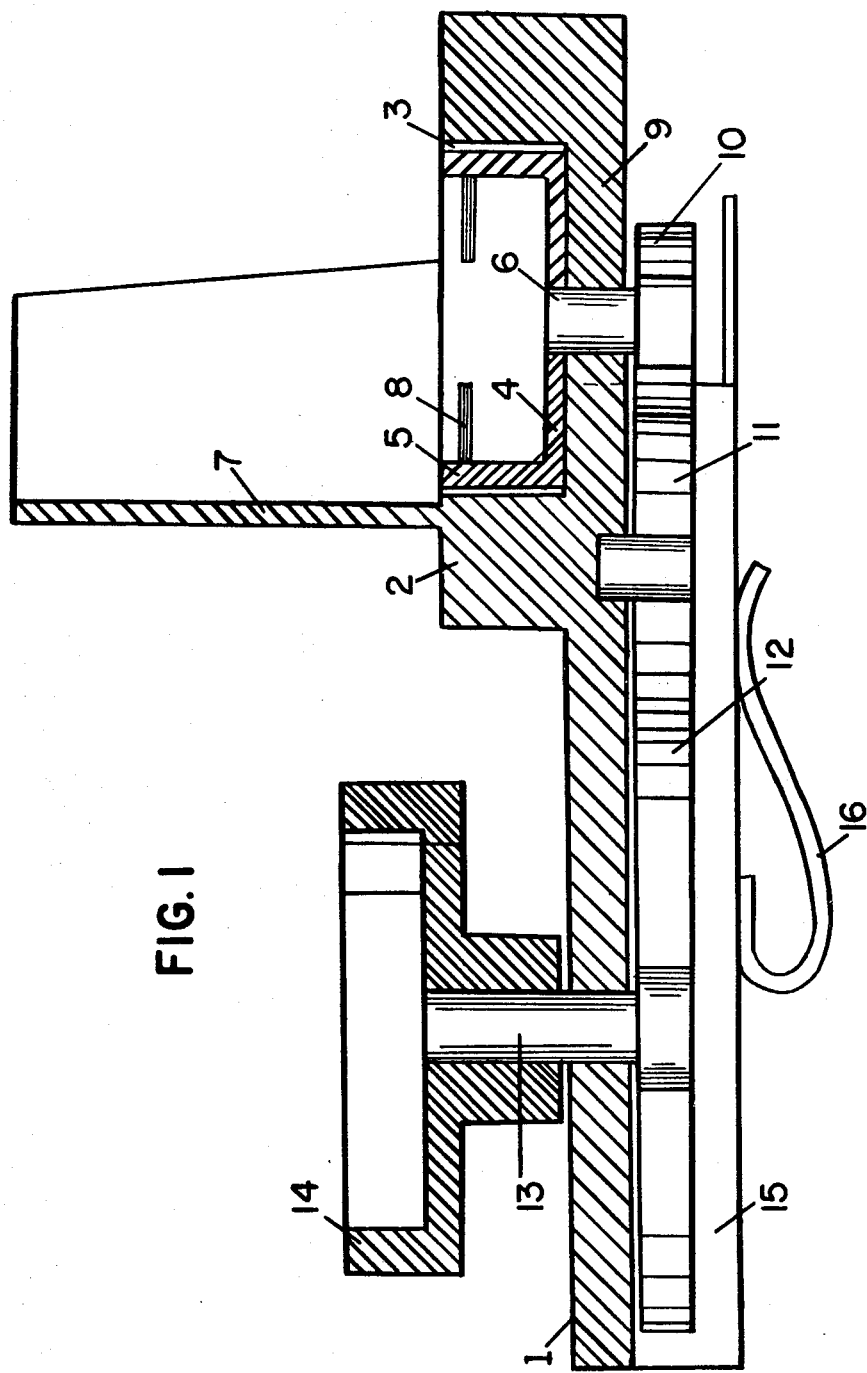
FIG. 1 shows a vertical cross section.

According to the embodiment shown in FIG. 1, the fork accessory means comprises a four cornered base or supporting plate 1 incorporating a reinforced, thicker part 2 which is equipped with a cylindrical recess 3. In the interior of said recess 3, there is rotatably arranged a cylindrical collar 5 with bottom 4. A short shaft 6 is connected to the bottom 4 and serves to rotatably support the collar 5 within the recess 3. Along the inner top edge of the collar 5, there are arranged a plurality of driving pins 8 which protrude vertically to the center of the collar 5. Along a part of the edge of the recess 3, there is provided a guiding wall 7, extending vertically upwards. As can also be seen from FIG. 2, the wall 7 is less curved than the edge of the recess 3 thereby facilitating the winding of spaghetti on a fork and the formation of a neat wrap of spaghetti.

The shaft 6 penetrates the bottom 9 of the recess 3 and bears a gear wheel 11, which latter in turn meshes with a driving gear wheel 12. The driving gear wheel 12 is arranged at the lower end of a driving shaft 13, which is received in a bore provided in the supporting plate 1. The upper end of the driving shaft 13 is fitted with a hand wheel 14.

At the two long edges of the supporting plate 1, there is provided a strip 15, each equipped with a clamp 16 to fix the fork accessary means at the edge of a dish (not shown).

In use, the fork ladden with a disordered bunch of spaghetti is inserted into the collar 5 and the hand wheel 14 is rotated. By means of the gear wheel 12, 11 and 10, the collar 5 is driven to a rotating movement, the pins 8 engaging the fork and urge the same to rotate as well. The guiding wall 7 forms the disordered bunch of spaghetti to a neat wrap, which is wound on the fork and which now can easily be lifted to the mouth and consumed.

To provide a simpler embodiment of the fork accessory means, the hand wheel 14 and the gear wheels 12, 11 and 10 can be omitted. In this case, the fork itself has to be rotated once it is inserted into the freely rotatable collar 5. In a still simpler embodiment, even the rotatable collar 5 can be omitted and the fork will be inserted directly into the recess 3 and therein rotated.

What I claim is:

1. A fork accessory for attachment to a dish for winding spaghetti on the fork comprising:
    a generally rectangular base having a thickened portion at one edge and a relatively thin portion at the other edge including clamping means to detachably secure said base to a dish, said thickened portion of said base having a circular recess
    a rotatable collar in said recess fitted with a plurality of pins protruding inwardly from the circumference of said collar for engaging the forks a shaft joined to the base of said collar, said shaft protruding from the bottom of said base below said recess;
    a driving mechanism connected to said shaft;
    a hand wheel means connected to said driving mechanism for rotating said collar and wrapping spaghetti about the fork; and
    a vertical guiding wall alongside said recess, said guiding wall projecting above said recess to guide the wrapped spaghetti about said fork.

2. An accessory as claimed in claim 1 wherein said said driving mechanism comprises a toothed first gear wheel, a second toothed idler wheel and a third toothed driving gear wheel, said first gear wheel being connected to the free end of said shaft, said third driving gear wheel being rotatably supported in said supporting base at a predetermined distance from said first gear wheel by means of said driving shaft with the upper end being equipped with said hand wheel and said idler wheel being freely rotatable between said first gear wheel and said third driving gear wheel and intermeshing with both of said first and said third gear wheels.

* * * * *